United States Patent [19]

Fischer

[11] Patent Number: 5,413,934
[45] Date of Patent: May 9, 1995

[54] COMPOST CONTAINER

[76] Inventor: Joergen Fischer, Soelystgade 31, DK-8000 Aarhus C, Denmark

[21] Appl. No.: 134,898

[22] Filed: Oct. 13, 1993

[51] Int. Cl.⁶ .............................................. C12M 1/10
[52] U.S. Cl. ................................... 435/312; 435/313; 422/184; 220/908
[58] Field of Search ............... 435/287, 299, 311, 312, 435/313, 315, 316; 422/184; 71/9; 220/484, 908

[56] References Cited

U.S. PATENT DOCUMENTS

| | | | |
|---|---|---|---|
| 4,984,561 | 1/1991 | Warrington | 71/9 |
| 5,185,261 | 2/1993 | Warrington | 435/313 |

FOREIGN PATENT DOCUMENTS

| | | | |
|---|---|---|---|
| 1141690 | 6/1986 | Japan | 435/287 |
| 2038304 | 7/1980 | United Kingdom | 422/184 |
| 9110631 | 7/1991 | WIPO | 435/313 |
| 9204303 | 3/1992 | WIPO | 435/287 |

Primary Examiner—William H. Beisner
Attorney, Agent, or Firm—Watson, Cole, Grindle & Watson

[57] ABSTRACT

A compost container (1) for organic household waste wherein an inward oriented flange (9) resting on the base plate (3) of the container is provided at the bottom of the enclosure (2) of the container. The enclosure extends beyond the flange into a circular groove (10) in the base plate. At a central part, the base plate (3) of the container is provided with a mounting ring (22) in which a perforated pipe (5) is arranged, the pipe extending into the inside of the container and a perforated pipe (6) extending into the ground under the compost container, these pipes being filled with a granulated material. Owing to this arrangement, the composted matter may be ventilated while at the same time compost worms may move into the ground when it is very cold or very hot.

10 Claims, 4 Drawing Sheets

COMPOST CONTAINER

FIELD OF THE INVENTION

The present invention relates to a compost container for composting organic waste, especially vegetable household waste and light garden waste, and of the type which comprises a container enclosure having the shape of a truncated cone, which enclosure is provided with an extraction opening situated at the bottom and covered by a lid as well as a feeding opening situated at the top and provided with a cover, and which enclosure is placed rotatably on a separate base plate and is provided with ventilation openings in the base plate, in the upper portion of the enclosure and in the cover.

THE PRIOR ART

Various compost containers of this kind are known wherein the enclosure is placed on a separate base plate. However, the known compost containers are disadvantageous in that they fail to provide sufficient ventilation or control of same for the composting process. The enclosure will also tend to separate from the base plate when rotated for removal of composted waste through the extraction opening. Furthermore, the containers of the prior art will not sufficiently well keep out mice, rats, blowflies, fruit flies, or other animals and insects which are undesirable in the compost container. The ventilation of known compost containers is based on the principle that fresh air may pass under the bottom and up through perforations in the base plate and will, as a result of heating by compost heat and sun heat, rise and be pressed out through ventilation openings provided in the upper portion and/or in the cover of the container.

When the compost matter is removed through the extraction opening while the enclosure is rotating, the above lying compost matter will sink in the container. Due to the truncated cone shape of the enclosure, at least for a short period an annular space will be created between the container enclosure and the compost matter. Thus, the ventilation of the compost matter at the surface facing the enclosure will be accelerated as the air may now pass from the outer ventilation openings in the base plate up along the enclosure and out through the ventilation openings in the upper portion of the container. However, after a short period the compost matter will slide towards the container enclosure so that the ventilation is diminished or stopped.

As the enclosure is rotatably mounted on the base plate, the compost matter may be extracted from any direction so that the compost matter is ventilated as well as possible all along the periphery of the truncated cone which is formed when the compost matter has sunk. Thus it is desirable to be able to rotate the container.

However, experience has shown that the container enclosure tends to separate from the base plate when rotated. The enclosure's tendency to separate increases with increasing amounts of material in the container. The enclosure's separating from the base plate will cause the container to become unstable, and at the same time it will provide free access for mice, rats, water voles, and other animals.

Experience has shown that the activity of compost worms in the compost container will accelerate the ventilation and consequently accelerate the admission of air for the composting process. Thus, the air is able to penetrate into the compost matter through the paths of the compost worms. However, experience has shown that adding worms to the compost matter has only partially remedied the problems related to insufficient ventilation. This is due to the fact that the compost worms do not have optimal conditions of life. Thus the worms are in danger of dying when the temperature in the container becomes too high owing to the effect of the sun or too low because of frost. Furthermore, there is also a risk that the compost worms may leave the container or die due to gases developed by the anaerobic decomposition which occurs when the compost matter is insufficiently ventilated. Thus, with containers of the prior art it has not been possible to achieve satisfactory ventilation. Particularly in cold periods the admission of fresh air will be insufficient, which means that the composting process will stop and instead an anaerobic decomposition process occurs which develops malodorous gases.

The ventilation openings at the top of known container enclosures have proved to be disadvantageous because insects such as blowflies, fruit flies, and others, will enter through the ventilation openings from the surface of the container, and in some cases it is also experienced that mice and rats may enter through these ventilation openings, whose size may be adjusted by rotating the cover so that the ventilation openings in the cover and the enclosure cooperate to regulate the admission of air which enters through the ventilation openings in the base plate of the container.

The object of the present invention is to remedy the above-mentioned drawbacks by providing a compost container of the type mentioned initially and which makes it possible to remedy the noted drawbacks and which is simple to manufacture.

SUMMARY OF THE INVENTION

This is achieved with a compost container which is characterized in that the base plate is perforated, that a perforated mounting ring is arranged in the centre of the base plate, preferably in the form of a depression in the base plate which supports a perforated pipe which at least extends into the inside of the container, that the perforated pipe extends from the inside of the container into the ground under the container, and that pipe is filled with a granulated material.

The perforations in the base plate and the perforated vertical pipe, which has perforations aligned with perforations in the base plate, make it possible to provide ventilation of the innermost part of the compost matter so that composting will take place aerobically and consequently without bad smells. The perforated pipe may extend almost up to the cover. It is noted that the base plate is designed as a substantially downward oriented dish with perforations in its marginal area. This permits free admission of air into the space beneath the base plate.

The perforations in the mounting ring, the vertical pipe and a possible connection link between the pipe and the mounting ring ensure the admission of air in order to avoid bad smells. As the vertical ventilation pipe is filled with a granulated material, e.g. chips of an expanded polystyrene, and is joined with a perforated pipe extending into the ground and also filled with a granulated material, the joined pipe may also be used by the compost worms present inside the container. Thus, at very low temperatures the compost worms may move into frost-free depth under the compost container.

The joined pipe may also be used in the summertime when very high temperatures occur in the compost container when it is exposed to sunlight. In this situation, the compost worms will also quickly move down through the pipe into the ground under the compost container where an earth temperature exists. It is noted that compost worms, which are unable to move through ordinary compact soil, are epigean and thus prefer to move on top of surfaces. Therefore, it is advantageous that the pipe has been filled with a granulate on which the compost worms may move.

Owing to the use of an inward oriented annular flange in the enclosure, the compost matter present in the container will load the upper surface of the flange. Thus the enclosure of the container will always be pressed down and consequently be kept in engagement with the base plate as the extension of the enclosure is situated in a groove in the base plate.

The inward oriented flange will not only cause the downward pressure on the enclosure of the container, it will also reduce the risk that compost matter gets into the circular groove. This is further participating in securing the mutual position of the enclosure and the base plate.

Furthermore, the flange may be produced with such radial extension and shape that a large load area is achieved, causing the wear between the enclosure and the base plate to be reduced.

The enclosure for a compost container according to the invention may advantageously be produced from three pressure diecasted part elements, preferably from recycled plastics of the types PE and PP. Such part elements are joined by extruded dovetail guides which extend across projections on each of the arched part elements. This is a simple and inexpensive arrangement compared to traditional compost containers manufactured by extrusion and rotation moulding. The cover, the pipes, and the lid will also be produced from recycled plastics whereas the base plate may advantageously be produced from metal, preferably an aluminium-zinc plate. This makes the base plate stable and at the same time mice and rats are prevented from entering when the perforations have a diameter not exceding 9 mm. A plate thickness of 0.5-0.1 mm will give a stable support due to three-dimensional mould pressing.

The outer sharp edge of the base plate may advantageously be protected by an annular plastic profile with a diameter slightly smaller than the outer diameter of the base plate. The natural elasticity of the annular plastic profile will ensure that it is kept tightly onto the edge of the base plate and thus provides good protection without any risk that the user will cut himself on the sharp edges of the base plate.

In order to prevent flies from entering through the ventilation openings in the enclosure and cover of the container and in order to ensure minimal resistance for the ventilation air, the ventilation openings may advantageously be covered by a plastic net with a mesh size not exceding 0.6 mm. In order to ensure that the net is tight against the ventilation openings, the net may be produced as an annular net with a diameter slightly smaller than the diameter of the net's contact surface on the enclosure of the container. Owing to this arrangement the natural elasticity of the plastic will cause it to be tightened against the ventilation openings so that no slots occur through which insects might enter into the container. The plastic net may advantageously be placed protected inside an annular element which will be referred to in the next paragraph.

In order to ensure high stability and an impact-proof edge on the compost container, an annular element with a downward orientated U-shaped groove, into which the upper end of the enclosure is inserted, is placed at the upper end of the compost container. The annular element will stabilize the container and will at the same time constitute an impact-proof edge so that shovels, forks and the like will not damage the upper edge of the enclosure of the container.

According to a special embodiment of the compost container, the cover may be produced from two concentric cover parts, i.e. an outer annular cover part and a smaller circular cover part arranged in the former one. Such a construction facilitates filling of daily amounts of kitchen waste into the container, particularly for children since the weight of such a smaller cover is considerably smaller and consequently easy to operate by one hand by means of a handle. The two cover parts may be mutually connected in various ways, e.g. by bayonet fittings in which a small rotation provide a locking, or with a snap function between the two parts of the cover. It will also be possible that the central cover part simple rests loosely in the annular cover part.

The compost container will now be further explained with reference to the accompanying drawings.

DETAILED DESCRIPTION OF THE PREFERRED EMBODIMENT

Figure 1:
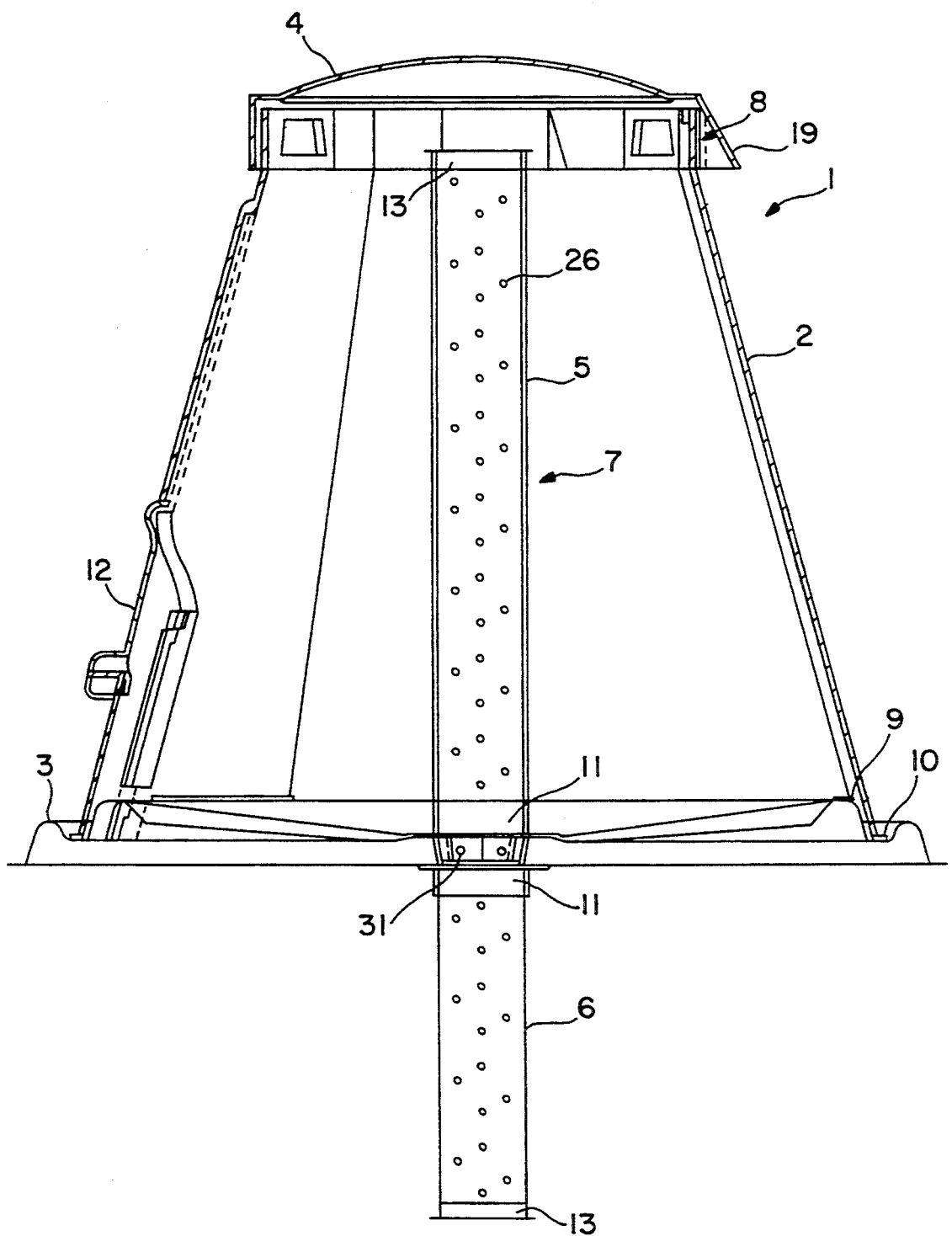
FIG. 1 shows a vertical section view through a compost container comprising an enclosure placed on a base plate in which a perforated pipe is mounted.

FIG. 1 shows a compost container 1 which substantially consists of an enclosure 2, a base plate 3, a cover 4, an insect net 8, a perforated pipe 5 and a perforated pipe 6 forming a united pipe 7. In the embodiment shown, the enclosure is provided with a flange 9 formed on the inside of the enclosure and in contact with the base plate 3. The enclosure extends beyond the flange down into a circular groove 10 provided in the base plate 3.

The flange 9 has the effect that part of the contents in the compost container will help to retain the mutual engagement between the enclosure and the base plate.

Alternatively, the enclosure may also rest on the bottom of the circular groove 10 provided in the base plate 3.

Figure 5:
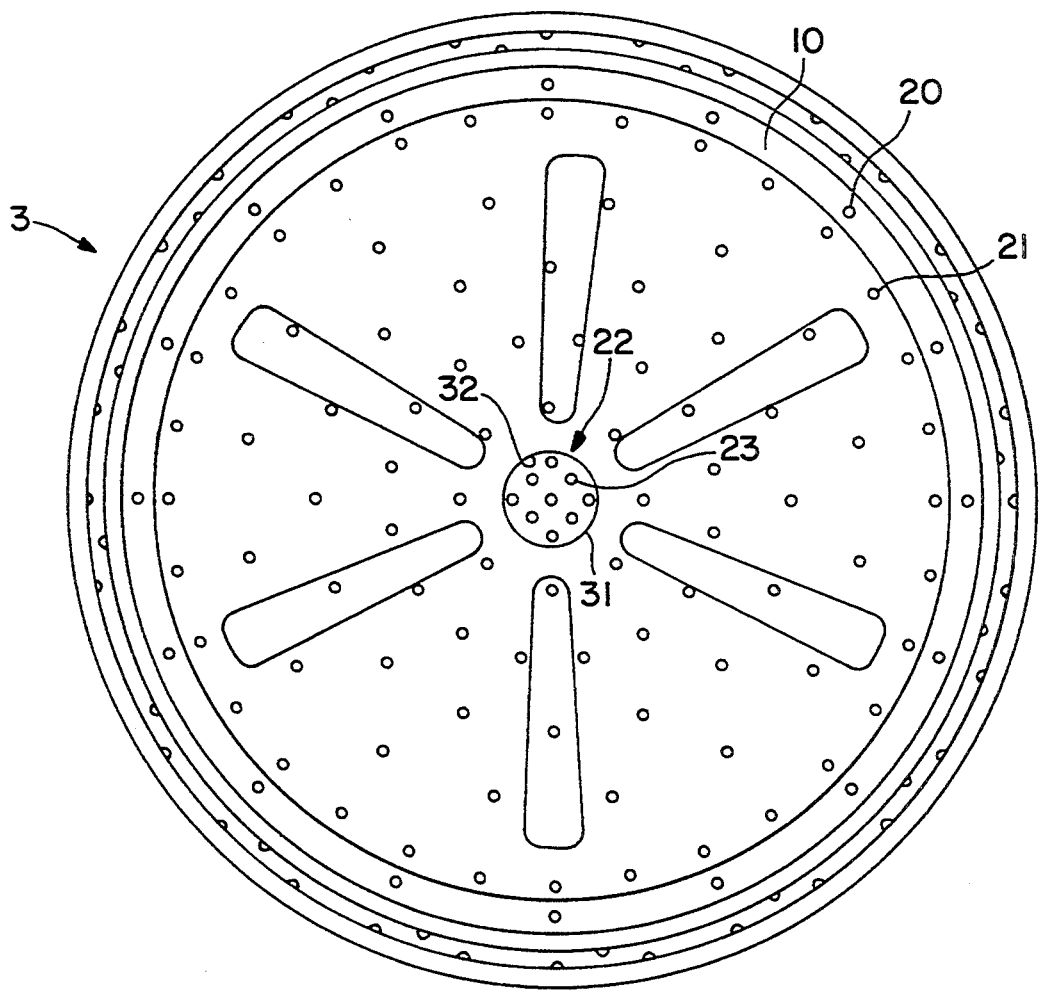
FIG. 5 shows the base plate, seen from above, wherein drainage holes clearly occur, as well as a mounting ring for mounting the perforated pipe.

The pipe 5, the principal function of which is to ventilate the composted material, and the pipe 6 may form a joined perforated pipe 7 by means of two connection links 11 and admission holes 23 in the bottom of the mounting ring 22 in the centre of the base plate 3 (see FIG. 5). The pipe 7 passes through the centre of the base plate 3 and both upwards into the centre of the compost container and downwards into the ground.

The connection links 11 have slots 28 (see FIG. 8) which are designed not to cover the ventilation holes 31 provided in the cylindrical wall 32 of the mounting ring (see FIG. 5). When the joined pipe 7 is filled with a granulate, it may be used by compost worms. Through the granulate, they can move to and from the compost container in case the temperature becomes either too low or too high. The pipe 5 and the pipe 6 are both provided with plugs 13 at their distal ends preventing the pipe 7 from being filled with compost material or earth and at the same time preventing the granulate from running out of the pipe 7. The granulate is of such a size that it cannot pass through holes 26 in the perforated pipe 7. The granulate may for example be so-called chips.

A lid 12 which makes it possible to extract finished compost is placed in the substantially cone-shaped enclosure 2 of the compost container. The extraction of compost is made possible along the whole periphery of the container through rotation of the enclosure.

Figure 2:
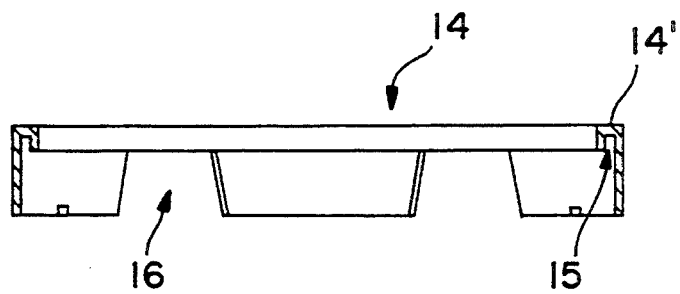
FIG. 2 shows an annular element provided with a downward oriented U-shaped groove.

FIG. 2 shows an annular element 14 to be mounted on the upper part of the enclosure of the compost container. The element is provided with a U-shaped groove 15 and slots 16 for the ventilation openings. The U-shaped groove helps to stabilize the enclosure and to form an edge 14' which will resist impacts, e.g. from a garden shovel.

Figure 3:
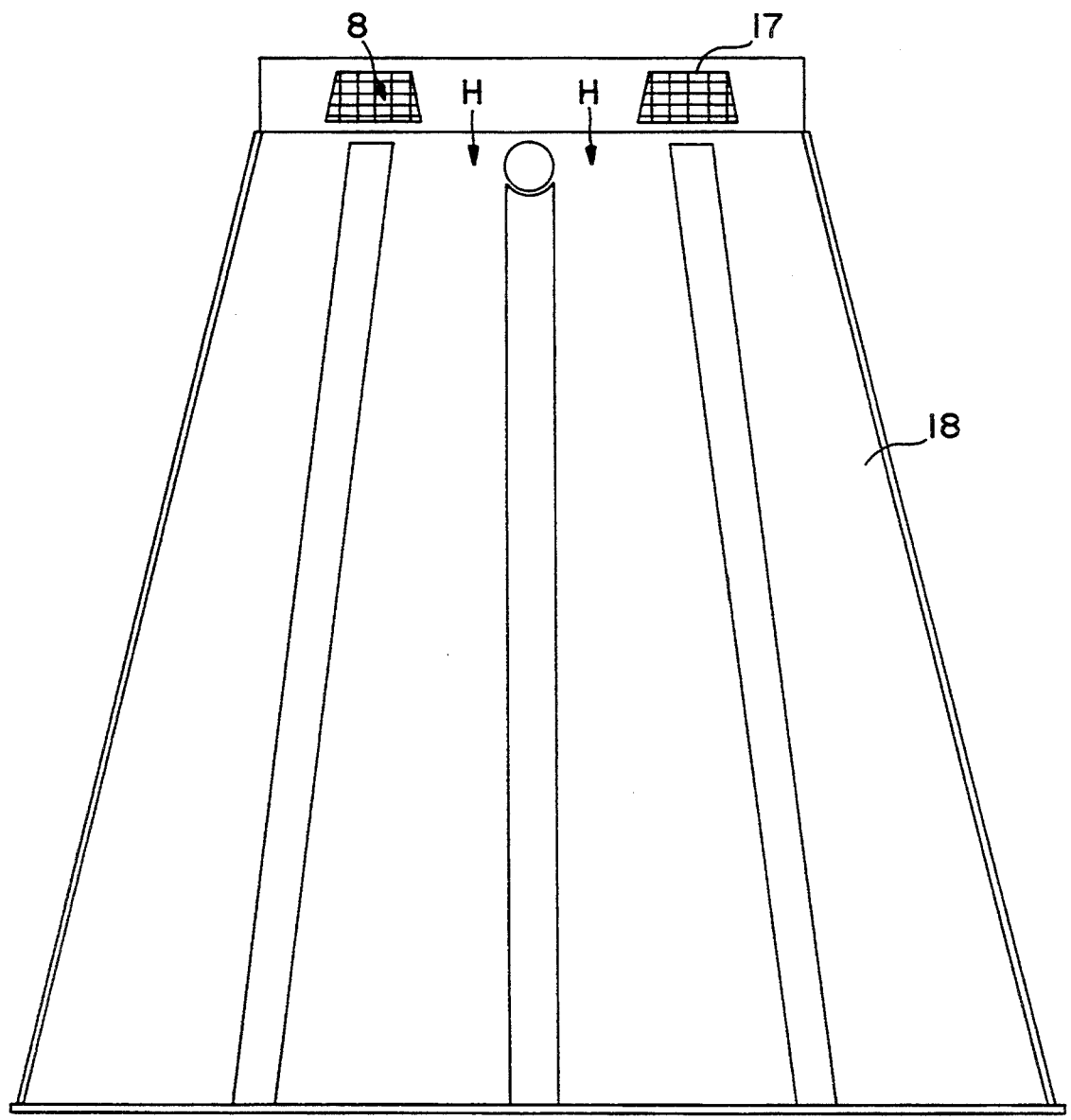
FIG. 3 shows a view of an arched part element for the container enclosure in which an insect net and ventilation openings are indicated.

FIG. 3 shows a side view of a part element 18 for the enclosure 2 of a compost container 1. The part element 18 comprises ventilation openings 17, and for the sake of illustration the figure shows an insect net 8 mounted behind the ventilation openings 17. These ventilation openings with the insect net cooperate with ventilation channels 19 in the cover 4; this makes it possible to vary the admission of air into the compost container. This is done by rotating the cover 4 of the compost container.

Preferably, the insect nets used have such a mesh size that insects such as fruit flies are unable to force their way into the compost matter even if the ventilation openings 17, 19 are open. This means that the meshes of the insect net must have a diameter of maximum 0.6 mm and, at slots, a width not exceeding 0.5 mm in the narrowest dimension.

Figure 4:
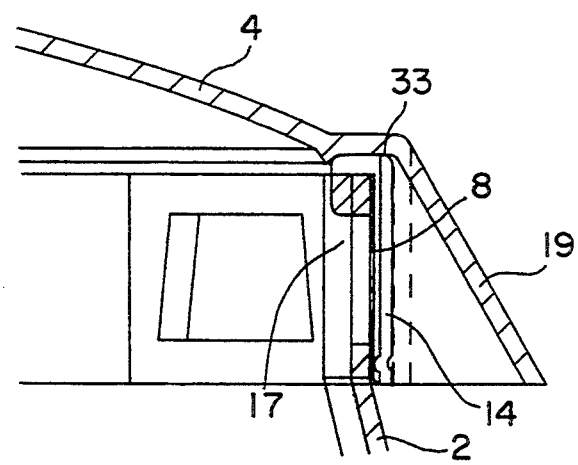
FIG. 4 shows a partial and enlarged sectional view through the upper portion of the compost container.

FIG. 4 shows the insect net 8 mounted between the U-shaped annular element 14 and the enclosure 2. Also shown are the ventilation channels 19 in a position in front of the ventilation openings 17. The size of the ventilation channels 19 corresponds to the size of the ventilation openings 17. The cover 4 is designed so that an unbroken contact surface 33 is provided between the annular element 14 and the cover 4.

FIG. 5 shows the base plate 3 seen from above. It clearly occur that drainage holes 20 are provided in the circular groove 10, which drainage holes help to prevent the enclosure and the base plate from freezing together. Furthermore, the base plate is provided with other ventilation holes 21 which at the same time make it possible to drain off water from the inside of the compost container, e.g. condense water. If this was not the case, the enclosure might be pressed out of the groove 10 in frosty weather. In the centre of the base plate, the mounting ring 22 is formed as an integral portion of the remainder of the base. At its upper and lower surface, the mounting ring is designed to receive one end of the connection link 11 for connecting the perforated pipes 5, 6. Openings 31 are provided in the cylindrical wall 32 of the mounting ring, and ventilation openings 23 which may at the same time serve as passages for compost worms are provided in the bottom of the mounting ring.

The holes 21, 23, and 31 have a diametre which does not exceed 9 mm. In case they are designed as slots, their width must not exceed 7 mm in their narrowest dimension. In this manner the base plate is secured against the entrance of mice and rats.

Figure 6:
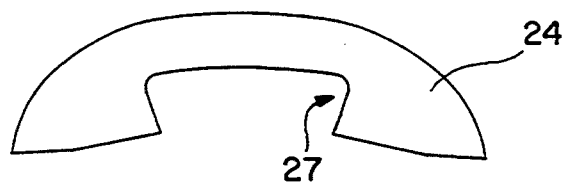
FIG. 6 shows a sectional view through a dovetail guide used for joining the part elements of the enclosure.

FIG. 6 shows a section view through a guide 24 with a dovetail groove 27 used for joining the three part elements 18 which will normally constitute the enclosure.

Figure 7:
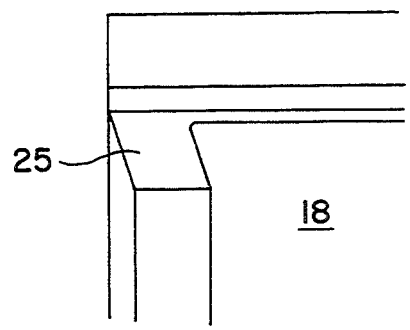
FIG. 7 is a partial view showing the projection on the arched part elements on which the dovetail guides are mounted.

FIG. 7 shows a projection 25 placed along each outer edge of the part elements 18. The projections 25 extend from the upper portion to the lower portion of the part element 18 and are intended to cooperate with the grooves 27 in the joint guides 24 in order to connect the part elements 18 of the enclosure.

Figure 8:
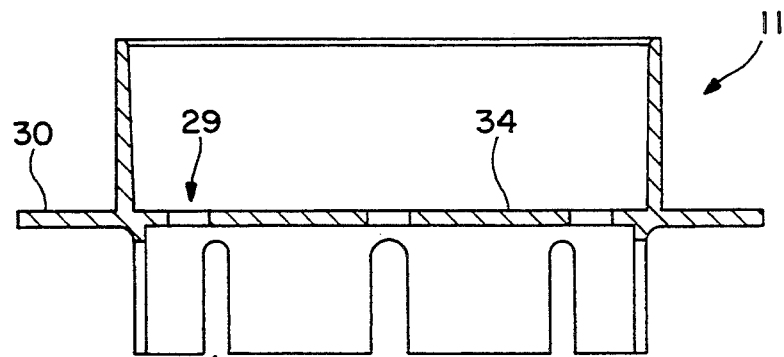
FIG. 8 shows a connection link to be placed in the mounting ring.

FIG. 8 shows a connection link 11 in which the slots 28 ensure that the holes 31 will not be covered. In the radial wall 34 of the connection link 11 passage holes 29 for compost worms are provided. When placing the connection link 11 in the mounting ring 22 it is vital to position it so that the ventilation openings 23 and 31 will not be covered. A covering would prevent an effective ventilation of the compost matter. Besides, the holes 23 must be kept free so that the compost worms may pass freely. An outward oriented flange 30 on the connection link has several functions. When mounted inside the container, the flange rests on the surface of the base plate and supports the ventilation pipe 5 when the amount of compost matter is minimal. When mounted externally, the flange 30 rests on the ground surface. This will support the base plate and prevent it from sagging. This might cause the enclosure 2 to be forced up or get jammed.

Figure 9:
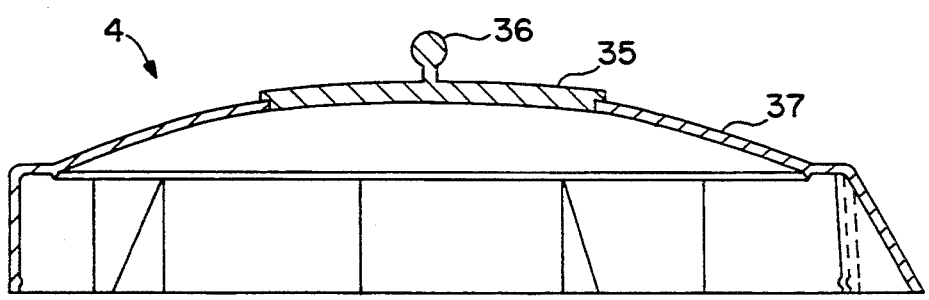
FIG. 9 shows a sectional view through a two part cover.

FIG. 9 shows a sectional view through a two part cover 4. The cover consists of a central part 35, provided with a handle 36 and an annular part 37 wherein the central part is mounted. This permits the central part 37 to be removed without the whole annular part 37 being removed from the enclosure of the container when a small amount of compost matter is to be filled in. Thus the compost container is user-friendly since the user does not have to lift the whole cover which may have a weight from 2 to 4 kg. Besides, the regulation of the ventilation openings will not be affected by the filling. There is thus better security for correct ventilation of the container. The two parts of the cover 35,37 may be mutually connected by any known connection means, e.g. bayonet fittings, snap devices, or the like.

I claim:

1. A compost container for composting organic waste above ground which comprises:
    a perforated base plate which includes a perforated mounting ring in a center thereof,
    a frustoconical enclosure means which is rotatably positioned on said base plate, said enclosure means defining a bottom edge along a lower portion thereof, an extraction opening in said lower portion thereof, and a top edge along an upper portion thereof defining a feeding opening, said enclosure means defining ventilation openings in said upper portion thereof, a lid means for covering said extraction opening of said enclosure means, a cover means for covering said feeding opening of said enclosure means, said cover means defining a ventilation opening, and a perforated pipe containing granulated material extending from the ground below the compost container upwardly through said perforated mounting ring and within the enclosure means thereabove.

2. A compost container according to claim 1, including a connection member for connecting said perforated pipe to said mounting ring, said connection member including a flange which rests on an upper side of the base plate when mounted above the base plate.

3. A compost container according to claim 1, wherein said base plate defines a circumferential groove in an upper surface thereof, and wherein said enclosure means includes an inwardly-extending flange which rests on said base plate such that said bottom edge thereof extends into said circumferential groove.

4. A compost container according to claim 3, wherein said bottom edge of said enclosure means contacts a bottom of said circumferential groove on said base plate.

5. A compost container according to claim 1, wherein said enclosure means is formed of three pressure diecasted elements which define upwardly-extending side edges and projections adjacent thereto, and including dovetail guides which clamp together projections of adjacent elements to connect said elements together.

6. A compost container according to claim 5, including an annular impact-proof element positioned around the upper portion of the enclosure means, the annular element defining a downwardly oriented U-shaped groove which fits over the upper edge of the enclosure means as defined by said three diecast elements.

7. A compost container according to claim 1, including a plastic mesh net having a mesh size of less than 0.6 mm covering the ventilation openings in the enclosure means and including an annular member positioned around the upper end of the enclosure means to secure said plastic mesh net in place.

8. A compost container according to claim 1, wherein the granulated material in the pipe is a water resistant granulate, and wherein the pipe is provided with openings dimensioned so as to prevent the granulate from falling out while at the same time allowing compost worms to pass through the openings.

9. A compost container according to claim 1, wherein the cover means is in two parts and consists of a central portion provided with a handle and mounted in an annular portion whose outer marginal area rests on the enclosure means.

10. A compost container according to claim 1, wherein the perforated mounting ring is provided in the form of a depression in the base plate.

* * * * *